Patented Feb. 25, 1936

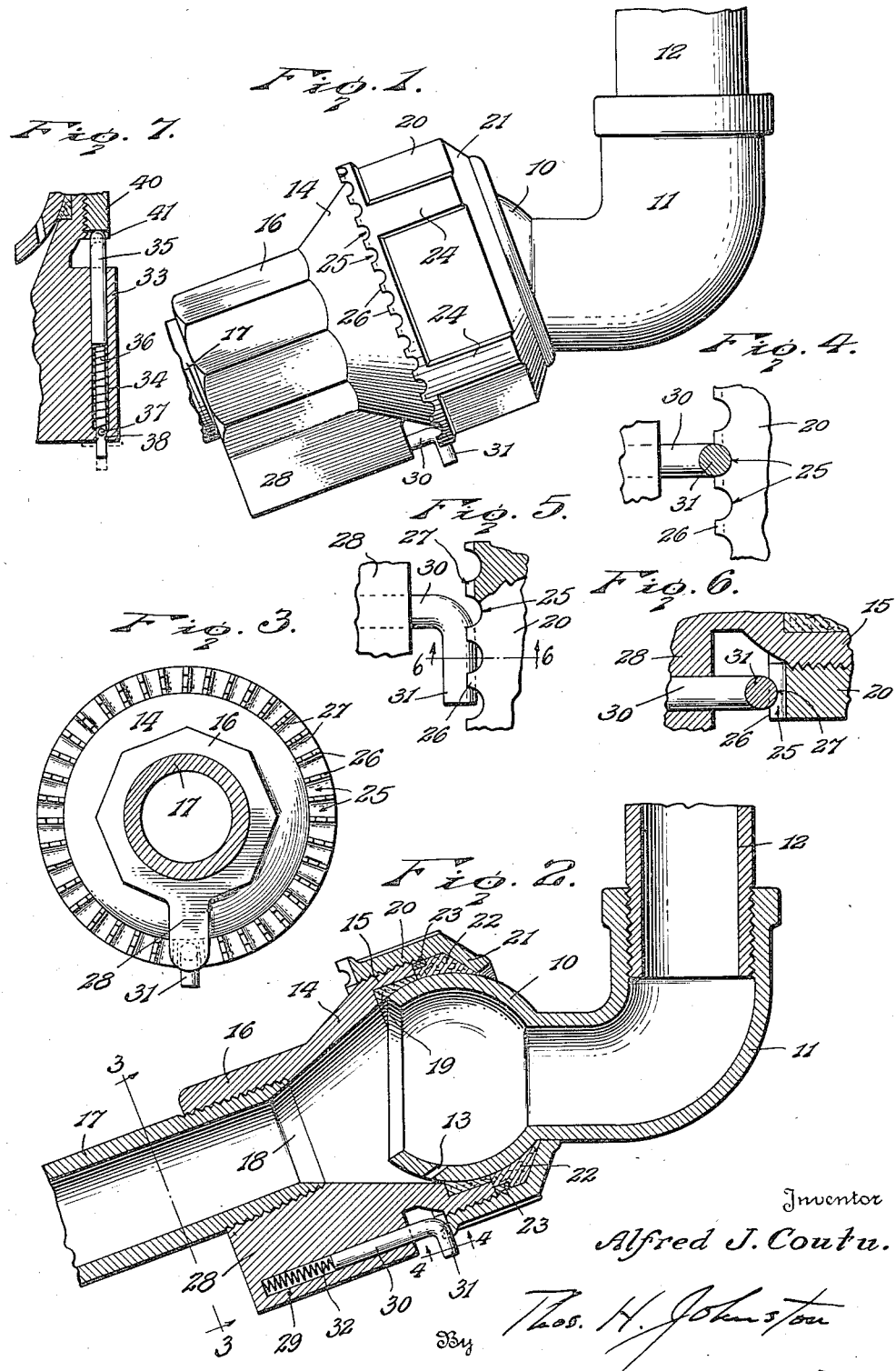

2,031,878

UNITED STATES PATENT OFFICE 2,031,878

ANGULAR BALL SWIVEL UNION

Alfred Joachim Coutu, Detroit, Mich.

Application October 22, 1935, Serial No. 46,183

6 Claims. (Cl. 285—9)

This invention relates to an improved angular ball swivel union and seeks, among other objects, to provide a device embodying a ball and socket which may be freely moved into angular relation without leakage between the parts.

The invention seeks, as a further object, to provide a device embodying a nut for retaining the ball and socket in coacting relation, wherein a packing ring will be employed between the nut and ball, wherein the nut will be formed to effectually coact with said ring for compressing said ring and feeding the ring against the ball to form a sealed joint therebetween and wherein the ring will be equipped with a retaining band which will function to shield the ring from distortion and mutilation.

Another object of the invention is to provide a device wherein the nut will be securely locked in adjusted position.

A still further object of the invention is to provide a lock for the nut wherein the spring-pressed locking key employed may be turned to ride against the nut in inactive position, so that the nut may be adjusted without the necessity of manually holding the key retracted.

And the invention seeks, as a still further object, to provide a device wherein the nut will block the displacement of the key, so that, while the nut is in position, the key cannot be removed or accidently lost.

Other and incidental objects of the invention, not specifically mentioned in the foregoing, will appear during the course of the following description, and in the drawing forming a part of my application, Figure 1 is a side elevation of my improved union.

Figure 2 is a sectional view of the device.

Figure 3 is a transverse section on the line 3—3 of Figure 2.

Figure 4 is a detail section on the line 4—4 of Figure 2.

Figure 5 is a detail elevation showing the head of the locking key in inactive position.

Figure 6 is a detail section on the line 6—6 of Figure 5.

Figure 7 is a fragmentary sectional view showing a slight modification of the invention.

In carrying the invention into effect, I employ a hollow ball 10 from which extends a reduced neck providing an elbow 11 and, as will be observed, the elbow is internally threaded at its free end to detachably receive a pipe, as conventionally shown at 12. Formed in the ball at one side thereof is a forwardly and downwardly sloping drain passage 13.

Coacting with the ball 10 is a socket having a conical body 14 which is formed at its larger end with a straight externally threaded flange 15 and at its smaller end with a nipple 16. The nipple 16 is preferably provided with external angular faces, as seen in Figure 1, while, as shown in Figure 2, the nipple is internally threaded to detachably receive a pipe 17. At its inner end, this pipe is internally beveled to form a conical face 18 which mates with and provides a continuation of the inner conical face of the body 14. Thus, liquid may drain from the ball into the socket whence the liquid may readily flow into the pipe 17.

Mounted within the flange 15 is an annular packing 19 which forms a seat for the ball 10, the flange being stepped to accommodate the packing. The packing may be of any approved material and terminates flush with the free edge of the flange 15.

Screwed over the flange 15 of the socket is a nut 20 detachably connecting the ball 10 with the socket. Formed on the nut at its outer end is an elongated conical flange 21 and fitting within the nut to coact with the equatorial belt of the ball 10 is an annular packing 22. This packing is provided with a flat inner end edge to seat against the free end edge of the flange 15 overlying the packing 19 while, at its outer end portion, said packing is externally beveled to provide a conical face which seats flat against the inner face of the flange 21 of the nut.

Attention is now directed to the fact that the inner face of the flange 21 of the nut is beveled from the annular wall of the nut to the free edge of said flange so that when the nut is adjusted downwardly, the flange will effectually coact with the beveled face of the packing 22 for compressing said packing and feeding the packing against the ball 10 to provide a sealed joint therebetween. Set into the packing 22 at its lower outer corner is an annular metallic retaining band 23. As will be seen, this band will serve as a shield for the packing and, when the nut 20 is tightened, will prevent the packing from being forced into the threads of the nut or the threads of the flange 15. The packing 22, like the packing 19, may be of any approved material.

Externally, the nut 20 is formed with wrench receiving ribs 24 and at its lower margin is stepped to provide a thickened flange in the lower edge of which is formed an annular series of semi-circular sockets 25 separated by a like series of intervening lugs 26. Formed in the lower edges of said lugs, as particularly seen in Figures 3, 5 and 6 of the drawing, is an annular series of semicircular notches 27 cooperating to provide an annular groove around the nut at the lower edges of said lugs.

Integrally formed on the body 14 of the socket at one side thereof is a flange 28 which is also integral with the nipple 16 to extend flush with the free end thereof and formed in said flange is a longitudinally extending bore 29. Slidably fitting in said bore is a locking key 30 which is provided at its outer end with an angularly disposed head 31 and interposed between the bottom of the bore and said key is a spring 32 urging the key outwardly to coact with the nut 20.

Normally, the head 31 of the key 30 stands engaged in one of the sockets 25 of the nut 20, as shown in Figures 2 and 4 of the drawing, when, as will be seen, the key will serve to effectually lock the nut against movement on the socket so that by no possibility can the nut work loose. When it is desired to adjust the nut, however, the head 31 of the key is, as shown in Figures 5 and 6, turned to engage in the notches 27 of the lugs 26. As will be appreciated, the nut may then be turned, when the head of the key will ride around the lugs 26 in the annular groove formed by said notches. Accordingly, the nut may be readily tightened or loosened without the necessity of manually holding the key retracted, after which the key may be turned to again engage the head 31 in one of the sockets 25 for locking the nut in adjusted position and, as will be seen, the thickened flange at the lower margin of the nut provides added strength as well as increased purchase for the head of the key.

In Figure 7 of the drawing, I have shown a slight modification of the invention. The flange of the socket is indicated at 33, this flange corresponding to the flange 28, and formed in the flange 33 is a stepped bore 34 opening through opposite ends of the flange. Slidable in said bore is a straight locking key 35 reduced to project through the outer end of the flange and surrounding the reduced portion of the key is a spring 36 urging the key to coact with the nut. Extending through the key near its outer end is a transverse pin 37 limiting the key against displacement by the spring 36 and formed in the outer end of the flange 33 to extend transversely of the bore 34 is a slot 38 adapted to freely accommodate the pin.

The nut is indicated at 40 and formed in the lower edge of the nut is an annular series of spaced radial sockets 41 adapted to selectively receive the inner end of the locking key 35. Thus, when the pin 37 is disposed in the slot 38, the inner end of the locking key will engage in one of the sockets 41 for locking the nut in adjusted position while by manually retracting the key and rotating it to dispose the pin 37 out of register with said slot, the pin will, upon the release of the key, coact with the outer end of the flange 33 for locking the key retracted so that the nut 40 may be freely adjusted. Otherwise, this modification is identical with the form of the invention first described and further explanation is accordingly believed unnecessary.

Having thus described the invention, I claim:

1. A union including a ball, a socket therefor, a rotatably adjustable nut connecting the ball and socket and provided with spaced sockets separated by intervening lugs, and a spring-pressed key carried by the socket and selectively engageable in the sockets of the nut for locking the nut in adjusted position, said key being movable to inactive position resting against said lugs to ride thereon, whereby the nut may be adjusted.

2. A union including a ball, a socket therefor, a rotatably adjustable nut connecting the ball and socket and provided with spaced sockets separated by intervening lugs notched at their free ends, and a spring-pressed key carried by the former socket and provided with an angularly disposed head selectively engageable in the sockets of the nut for locking the nut in adjusted position, the key being movable to inactive position having the head thereof engaged in the notches of said lugs to ride therein, whereby the nut may be adjusted.

3. A union including a ball, a socket therefor, a rotatably adjustable nut connecting the ball and socket and provided with spaced sockets separated by intervening lugs notched at their free ends, the notches in said lugs cooperating to provide an annular groove about the nut at the free ends of said lugs, a flange carried by the former socket, and a spring pressed key carried by said flange and provided with an angularly disposed head selectively engageable in the sockets of the nut for locking the nut in adjusted position, the key being movable to dispose the head thereof in inactive position seated in the groove formed by said notches to ride on said lugs, whereby the nut may be adjusted.

4. A union including a ball, a socket therefor having a flange provided with a bore therethrough and provided with a slot extending transversely of the bore at the outer end of the flange, a rotatably adjustable nut connecting the ball and socket, a rotatable spring pressed key slidable in said bore and urged to engage the nut for locking the nut in adjusted position, and a pin carried by the key and received in said slot when the key is engaged with the nut, the key being retractable to release the nut and being rotatable to engage said pin with the outer end of said flange for locking the key in retracted position.

5. A union including a ball, a socket therefor, a rotatably adjustable nut connecting the ball and socket, and locking means carried by the socket and urged to engage the nut, said means being movable to one position to positively engage and lock the nut against rotation and to another position slidably coacting with the nut, whereby the nut may be adjusted.

6. A union including a ball, a socket therefor, a rotatably adjustable nut connecting the ball and socket, and locking means carried by the socket and urged to engage the nut, the nut being provided with means positively engageable by said locking means for rigidly locking the nut against rotation and said last mentioned means being provided with means to slidably receive said locking means, whereby the nut may be adjusted.

ALFRED JOACHIM COUTU.